July 7, 1970  D. F. HASSINGER  3,519,134
TASTE TREATMENT ATTACHMENT FOR DRINKING WATER FAUCETS
Filed May 16, 1969

INVENTOR
DONALD F. HASSINGER

BY
*Olsen and Stephenson*
ATTORNEYS ately or the like in a position in which it is readily available for attachment to the faucet 12. A conventional snap action clamp unit 54 forms a part of the unit 10 and is located in the inlet end portion 16 of the body 14. As a result, by merely moving the body 14 upwardly with the clamp unit 54 aligned with the outlet end of the faucet 12, the unit 10 can be mounted on the faucet 12 in the operative position shown in FIG. 1. In this position of the attachment 10, water issuing through the outlet portion 18 will be directed downwardly so that it can readily flow into a cup, container or the like.

United States Patent Office 3,519,134
Patented July 7, 1970

3,519,134
TASTE TREATMENT ATTACHMENT FOR DRINKING WATER FAUCETS
Donald F. Hassinger, Ann Arbor, Mich., assignor to Pure Stat Corporation, Ann Arbor, Mich., a corporation of Michigan
Filed May 16, 1969, Ser. No. 825,313
Int. Cl. B01d 25/06
U.S. Cl. 210—282               1 Claim

ABSTRACT OF THE DISCLOSURE

A faucet attachment for improving the taste of drinking water consisting of a body which is readily mountable on a drinking water faucet when it is desired to draw drinking water therefrom. The body contains a replaceable cartridge in which activated charcoal and limestone particles are positioned so that water from the faucet entering the body first contacts the charcoal which functions to remove residual odors and tastes from the water and then contacts the limestone particles which impart the taste associated with spring water to the drinking water before it leaves the body. The attachment is readily removable from the faucet and supportable on a flat base surface for subsequent use when desired.

---

It is an object of this invention to provide an improved attachment for drinking water faucets for improving the taste of drinking water issuing therefrom.

The drinking water in many communities is notoriously poor tasting and has bad odors associated therewith. It is therefore desirable to provide a water taste treatment unit which can readily be placed on and removed from a drinking water faucet which is capable of imparting the uniformly desirable taste of spring water to drinking water issuing from the faucet. Furthermore, it is desirable to provide such a unit which can be effectively used over a prolonged service life.

The present invention provides an attachment for a faucet which is capable of imparting the taste of spring water to drinking water which is drawn from the faucet. This is accomplished by means of a removable cartridge in the attachment, the cartridge containing activated charcoal, limestone particles, and sand positioned between the charcoal and the limestone particles principally for the purpose of maintaining the charcoal and the limestone in desired positions in the cartridge. In these positions, water from the faucet first contacts the activated carbon particles which function to remove taste and odor from the water. The tasteless and odorless water then contacts the limestone particles which impart the taste of spring water to the water issuing from the attachment. The attachment contains a snap-on clamp unit at its inlet end which enables the attachment to be quickly mounted on and removed from a conventional faucet. The construction of the attachment so that it can be supported in an upright position on a flat surface, when not in use, further facilitates this quick use of the attachment on the faucet. The cartridge containing the activated carbon and the limestone is maintained in the body by a removable plug so that the cartridge can be removed and replaced when necessary.

Figure 1:
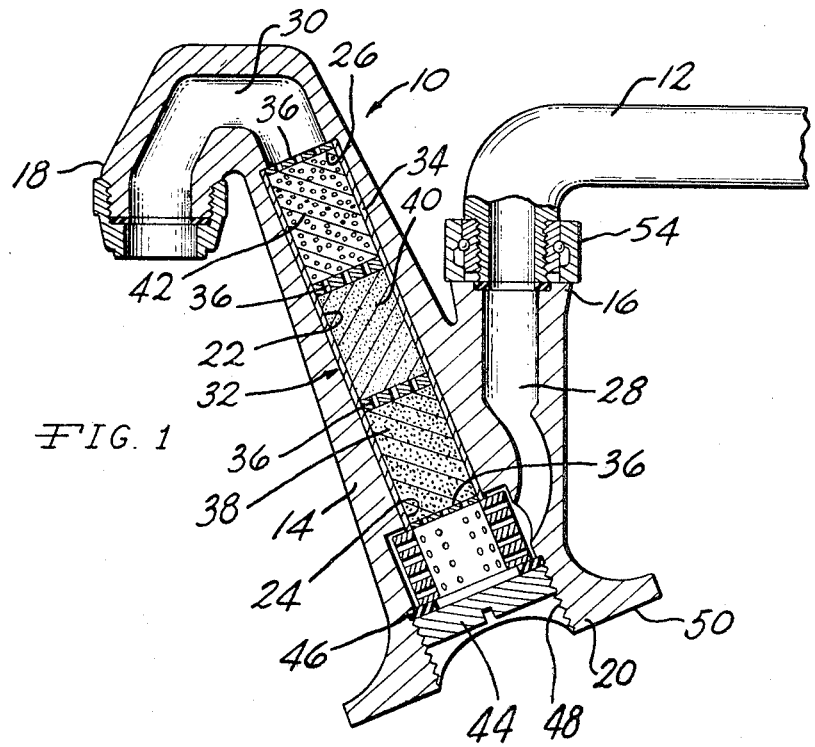
Figure 2:
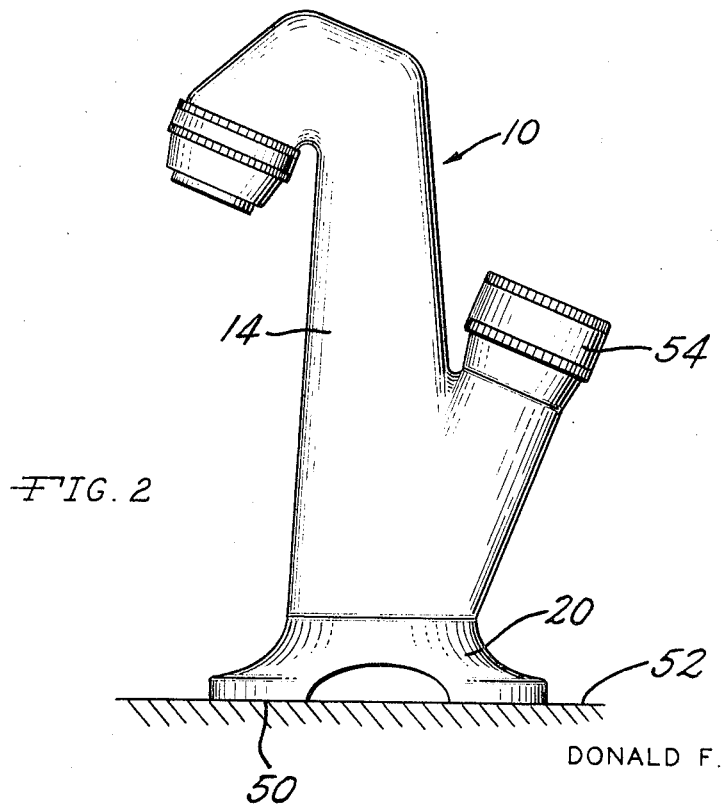

Further objects, features and advantages of this invention will become apparent from a consideration of the following description, the appended claims, and the accompanying drawing in which:

FIG. 1 is a longitudinal sectional view of the faucet attachment of this invention, shown in assembly relation with a drinking water faucet; and FIG. 2 is an elevational view of the attachment of this invention, illustrated in an upright supported position on a flat surface.

With reference to the drawing, the taste treatment attachment of this invention, indicated generally at 10, is illustrated in FIG. 1 mounted on a conventional drinking water faucet 12, only the desirable portion of which is shown. The attachment 10 consists of a body 14 having an inlet portion 16, an outlet portion 18, and a base 20. An elongated chamber 22 is formed in the body 14 so that it extends through the base 20. The chamber 22 also has an inlet end 24 and an outlet end 26. A first passage 28 is formed in the body 14 so that it extends between the inlet portion 16 and the inlet end 24 of the chamber 22. A second passage 30 in the body 14 extends between the outlet end 26 of the chamber 22 and the outlet portion 18 of the body 14.

A taste treatment cartridge, indicated generally at 32, is mounted in the chamber 22 as shown in FIG. 1. The cartridge 32 consist of an elongated housing 34 having screen units 36 mounted at its inlet and outlet ends and between its ends for separating activated carbon or charcoal 38, sand 40 and limestone particles 42 contained within the housing 34. The carbon 38 is positioned at the inlet end of the housing 34, the limestone particles 42 are positioned at the outlet end of the housing 34, and the sand 40 is located therebetween so as to maintain the carbon and the limestone in these positions. A removable retainer unit 44, containing a seal 46, is threaded into a threaded opening 48 in the base 20 at a position aligned with the chamber 22 for maintaining the cartridge 32 in the operative position shown in FIG. 1. When desired, the retainer unit 44 can be threaded out of the opening 48 to enable removal of the cartridge 32 for replacement purposes.

As best illustrated in FIG. 2, the base 20 of the body 14 is provided with a flat external surface 50 which serves as a support surface when the attachment 10 is not in use so that the attachment 10 can be supported in an upright position on a horizontal surface, such as the surface shown at 52. In other words, the body 14 is shaped so that the center of gravity thereof extends through the base surface 50 when the body 14 is in upright position illustrated in FIG. 2, thereby enabling support of the attachment 10 on a counter surface or the In the use of the attachment 10, water from the faucet 12 flows first through the activated carbon 38 which functions to remove bad tastes and odor from the water. The water then flows through the sand 40 and the limestone particles 42 which function to impart the taste of spring water to the water which ultimately issues through the outlet portion 18 of the attachment 10. It can thus be seen that water having the desirable taste of spring water is available at all times from the faucet 12 by merely mounting the attachment 10 thereon. When the cartridge 32 is to be replaced, it is only necessary to remove the retainer unit 44, withdraw the cartridge 32 from the chamber 22, replace it with a new cartridge 32, and reinstall the retainer unit 44.

I claim:
1. A faucet attachment for improving the taste of drink- ing water issuing therefrom, said attachment comprising a body having an outlet portion and an inlet portion, a snap acting annular clamp unit on said inlet portion adapted to encircle and engage a faucet, said body having a base and an elongated chamber extending through said base and having an inlet end and an outlet end, first passage means in said body extending between said inlet portion and said inlet end of said chamber, second passage means in said body extending between said outlet end of said chamber and said outlet portion of said body, a cartridge having an inlet end and an outlet end removably positioned in said chamber so that said inlet end of the cartridge communicates with said first passage means and said outlet end of the cartridge communicates with said second passage means, activated charcoal in said cartridge adjacent said inlet end thereof, limestone particles in said cartridge adjacent the outlet end thereof, means in said cartridge positioned between said charcoal and said limestone particles for maintaining said charcoal adjacent the inlet end of said cartridge and said limestone particles adjacent the outlet end of said cartridge, removable retainer means in said base aligned with said chamber for maintaining said cartridge in said position in said chamber, and said base being provided with a substantially flat external surface on which said body is supportable in an upright position.

References Cited

UNITED STATES PATENTS

| | | | |
|---|---|---|---|
| 989,965 | 4/1911 | Harloe | 210—283 |
| 1,432,351 | 10/1922 | McGahan | 210—284 |
| 2,072,848 | 3/1937 | Brown | 210—284 X |
| 2,729,337 | 1/1956 | Alterman | 210—284 X |
| 3,342,340 | 9/1967 | Shindell | 210—282 |

SAMIH N. ZAHARNA, Primary Examiner

U.S. Cl. X.R.

210—283, 290, 449